US012676735B2

(12) United States Patent
Osborn et al.

(10) Patent No.: US 12,676,735 B2
(45) Date of Patent: Jul. 7, 2026

(54) ELEVATING TRUST FOR USER AUTHENTICATION

(71) Applicant: Capital One Services, LLC, McLean, VA (US)

(72) Inventors: Kevin Osborn, Newton Highlands, MA (US); Srinivasa Chigurupati, Long Grove, IL (US); David Kelly Wurmfeld, Melbourne, FL (US)

(73) Assignee: Capital One Services, LLC, McLean, VA (US)

( * ) Notice: Subject to any disclaimer, the term of this patent is extended or adjusted under 35 U.S.C. 154(b) by 59 days.

(21) Appl. No.: 18/752,671

(22) Filed: Jun. 24, 2024

(65) Prior Publication Data

US 2025/0392449 A1 Dec. 25, 2025

(51) Int. Cl.
*H04L 9/08* (2006.01)
*H04L 9/32* (2006.01)

(52) U.S. Cl.
CPC .............. *H04L 9/0825* (2013.01); *H04L 9/32* (2013.01)

(58) Field of Classification Search
CPC ................................ H04L 9/0825; H04L 9/32
See application file for complete search history.

(56) References Cited

U.S. PATENT DOCUMENTS 10,503,905 B1 * 12/2019 Misra ...................... G06F 21/64
11,632,239 B2 * 4/2023 Sundaresan ........... H04L 63/083
 713/157
2019/0036681 A1 * 1/2019 Sundaresan ............... H04L 9/14

* cited by examiner

*Primary Examiner* — J. Brant Murphy
(74) *Attorney, Agent, or Firm* — Foley & Lardner LLP

(57) ABSTRACT

Systems and methods are described herein for handling authentication by elevating a user's authentication level as the user performs more operations. An authentication system may receive a first request for a first database operation. The first database operation may include first trust event data for a first trust event associated with a user to be written to a database. For example, a trust event may be a user completing some type of operation successfully. In some embodiments, the operation may be in relation to a third party. A successful operation may then be recorded in the database. As a result of the successful operation, when a trust level is calculated for the user, the trust level may be increased due to the successful operation.

20 Claims, 8 Drawing Sheets

400

403

| Trust_Data_1 | Parameters | Trust_Metric_1 |
|---|---|---|
| Trust_Data_2 | Parameters | Trust_Metric_2 |
| Trust_Data_3 | Parameters | Trust_Metric_3 |
| Trust_Data_4 | Parameters | Trust_Metric_4 |

406

409

412

200

203

| | |
|---|---|
| User Identifier | 0x19dE91Af973F404EDF5B4c0939 83a7c6Ebbb3ba |
| Parameter 1 | <Parameter Data> |
| Parameter 2 | <Parameter Data> |
| Parameter 3 | <Parameter Data> |

| User Identifier | 0x19dE91Af973F404EDF5B4c0939<br>83a7c6Ebbb3ba |

320

323                              326

| User Identifier | 0x19dE91Af973F404EDF5B4c0939<br>83a7c6Ebbb3ba |
| User Device Identifier | XYZ12354 |

400

| | | |
|---|---|---|
| Trust_Data_1 | Parameters | Trust_Metric_1 |
| Trust_Data_2 | Parameters | Trust_Metric_2 |
| Trust_Data_3 | Parameters | Trust_Metric_3 |
| Trust_Data_4 | Parameters | Trust_Metric_4 |

| Trust_Data_1 | Trust_Metric_1 |
|---|---|
| Trust_Data_2 | Trust_Metric_2 |
| Trust_Data_3 | Trust_Metric_3 |
| Trust_Data_4 | Trust_Metric_4 |

Receive a first request comprising first trust event data
802

Receive a second request comprising second trust event data
804

Receive a metric request for an authentication metric
806

Generate, based on the first trust event data and the second trust event data, an authentication metric for the user
808

Transmit the authentication metric to the requesting device
810

ELEVATING TRUST FOR USER AUTHENTICATION

SUMMARY

User identity management and authentication have seen major changes over the years. Starting from simple usernames and passwords, other authentication and authorization methods have been developed. From biometric authentication such as fingerprints and retina scans to face identification technologies, authentication and authorization systems have come a long way. However, it may be difficult to authenticate a user that has not been previously known. Too many authentication requirements may lead users to not use a particular service, while too few authentication requirements may authenticate and authorize bad actors to perform sensitive operations, thereby damaging organizations and institutions.

One mechanism for handling authentication is to elevate the user's authentication level as the user performs more operations. In particular, an authentication system may be used to perform operations described herein. The authentication system may receive a first request for a first database operation. The first database operation may include first trust event data for a first trust event associated with a user to be written to a database. For example, a trust event may be a user completing some type of operation successfully. In some embodiments, the operation may be in relation to a third party. A successful operation may then be recorded in the database. As a result of the successful operation, when a trust level is calculated for the user, the trust level may be increased due to the successful operation.

In some embodiments, the database may be a blockchain or another suitable electronic ledger system. Thus, the authentication system may receive a request for a blockchain operation. The authentication system may retrieve event parameters (e.g., parameters associated with the trust event) and may generate a command for a blockchain node to write the parameters representing the trust event to a block of a blockchain. The writing mechanism may associate the event parameters with the user's blockchain address (e.g., the user's blockchain public key).

The authentication system may receive, subsequent to the first request, a second request for a second database operation. The second database operation may include second trust event data for a second trust event associated with the user to be written into the database. Like the first operation, the second operation may be a user successfully completing an operation that will enable the user to have even higher trust (e.g., elevated trust) when a trust metric or score is calculated.

The authentication system may receive, from a requesting device, a metric request for an authentication metric. For example, a user may request some type of an operation that may require authentication. Thus, the requesting device may transmit, to the authentication system, a request for the trust level associated with the user. The trust level may be in a form of an authentication metric and may be pre-generated based on various operations completed by the user. In some embodiments, the trust level may be generated on the fly in response to the request. For example, when the request is received, the authentication system may retrieve, from the database, all trust event data (e.g., representing successful operations) associated with the user. Based on the trust event data, the authentication system may generate an authentication metric (e.g., a trust level or a trust score associated with the user).

In some embodiments, the metric request may be authenticated to ensure that the requesting party has a right to receive the authentication metric. The authentication system may receive a token with the request that may be used to authenticate the request. In some embodiments, only the user may be allowed to enable an entity to view the authentication metric. Thus, the authentication system may receive a cryptographic signature of the user with the request. That is, the user may have signed the request using the user's private key. Accordingly, the authentication system may use the user's public key to verify the authentication request. In some embodiments, the user's public key may be available on the blockchain via the blockchain node.

Thus, in some embodiments, the authentication system may generate, based on the first trust event data and the second trust event data that has been written to the database, the authentication metric for the user. The authentication metric may indicate a trust level associated with the user. Furthermore, the authentication metric may have been increased based on the second database operation and the first database operation. For example, the first database operation may raise the authentication metric to a particular level based on the trust parameters of the first event data, and the second database operation may raise the authentication metric to another higher level based on the trust parameters of the second event data. In some embodiments, a particular operation may fail. Thus, a failed operation may lower the authentication metric for the user based on the trust parameters of the failed operation. In some embodiments, each operation may have weight, and the weight may change over time. The authentication system may then transmit the authentication metric to the requesting device.

In some embodiments, the authentication system may encrypt the first and the second trust event data using a public key associated with the user so that only the user is able to decrypt the data using his or her private key. That is, the authentication system may retrieve a public key associated with the user based on a user identifier within the first request. The authentication system may then encrypt a first plurality of parameters within the first trust event data and a second plurality of parameters within the second trust event data using the public key associated with the user to generate encrypted first trust event data and encrypted second trust event data. The authentication system may then write the encrypted first trust event data and the encrypted second trust event data to the database. In some embodiments, the database may be a blockchain. Accordingly, the authentication system may retrieve a blockchain address associated with the user and use that address to derive a public key to then encrypt the data.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a portion of a request to write trust event data to a database, in accordance with one or more embodiments of this disclosure.

FIG. 4 illustrates a portion of a data structure for storing trust metrics for an authentication metric, in accordance with one or more embodiments of this disclosure.

FIG. 5 illustrates a portion of an alternative data structure for generating trust metrics for an authentication metric, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
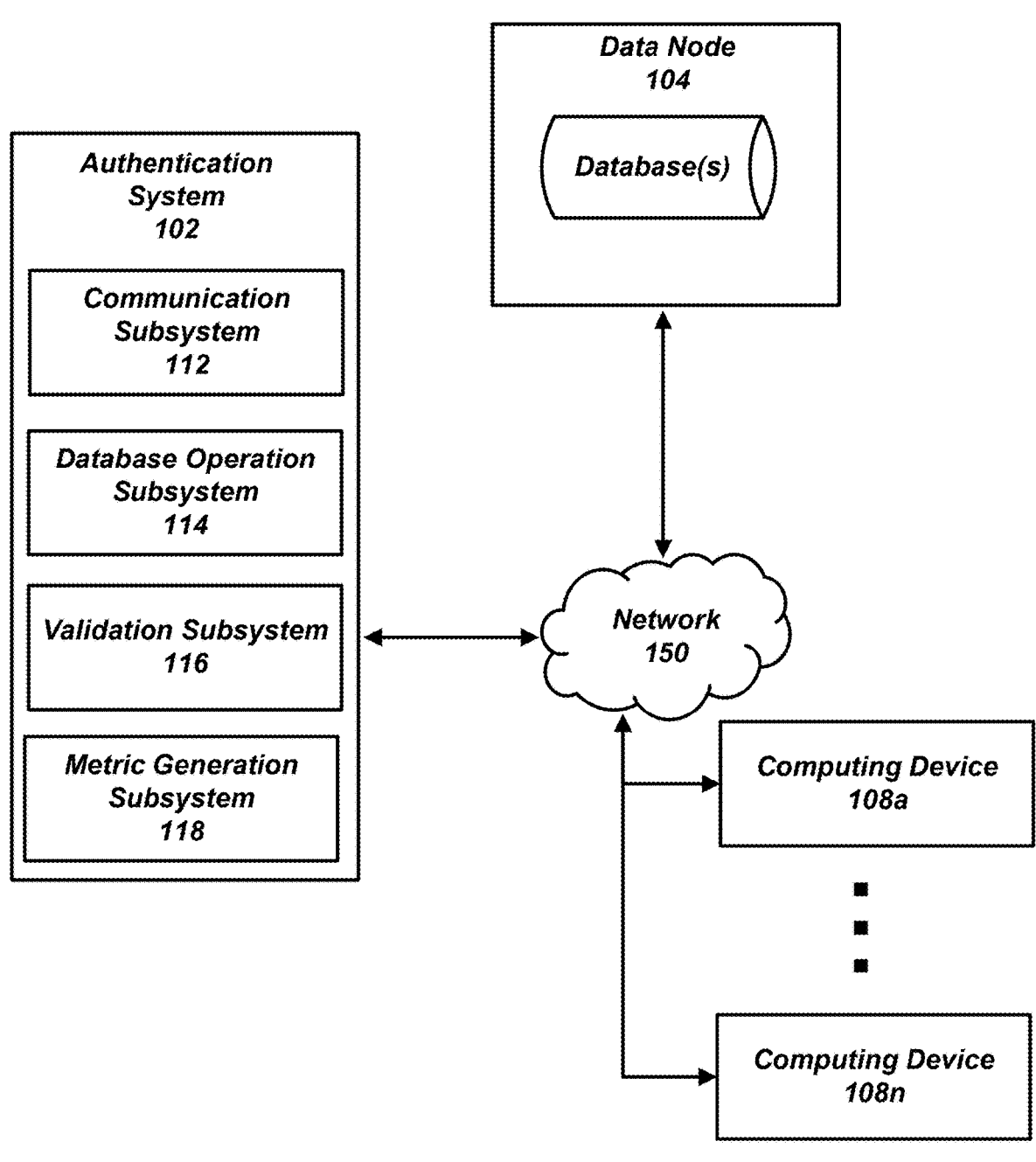
FIG. 1 shows an illustrative system for elevating a user's authentication level as the user performs more operations, in accordance with one or more embodiments of this disclosure.

FIG. 1 is an example of environment 100 for elevating user trust based on user activity. Environment 100 includes authentication system 102, data node 104, and computing devices 108a-108n. Authentication system 102 may execute instructions elevating user trust based on user actions. Authentication system 102 may include software, hardware, or a combination of the two. For example, authentication system 102 may be hosted on a physical server or a virtual server that is running on a physical computer system. In some embodiments, authentication system 102 may be configured on a user device (e.g., a laptop computer, a smartphone, a desktop computer, an electronic tablet, or another suitable user device). In some embodiments, authentication system 102 may be hosted on a blockchain and may execute operations on a blockchain node. For example, authentication system 102 may be a part of a smart contract or another on-chain program that is being executed by a blockchain node. In some embodiments, authentication system 102 may be hosted on an independent computing device and may send requests to the blockchain node to execute instructions (e.g., retrieve cryptographic tokens, mint cryptographic tokens, etc.).

Each computing device of computing devices 108a-108n may store a corresponding cryptography-based storage application that may sometimes be referred to as a cryptographic wallet. Each cryptography-based storage application may store a private key associated with a corresponding user and may include software, hardware, or a combination of the two. For example, each cryptography-based storage application may include software executed on one or multiple devices or may include hardware such as a physical device. In some cases, a cryptography-based storage application may be software and may be stored in data nodes, and a user of the cryptography-based storage application may access the cryptography-based storage application online, e.g., via a browser. Alternatively, or additionally, a cryptography-based storage application may reside on a general-purpose computer or on a special device (e.g., a fob) intended for storing the cryptography-based storage application. For example, the device may store private keys in a memory of the device and allow transactions to be completed on the device itself. Some examples of hardware cryptographic wallets include Ledger® and Trezor®. Software cryptographic wallets may include MetaMask® and others.

Data node 104 may store various data, including event data (e.g., event parameters). Data node 104 may include software, hardware, or a combination of the two. For example, data node 104 may be a physical server or a virtual server that is running on a physical computer system. In some embodiments, authentication system 102 and data node 104 may reside on the same hardware and/or the same virtual server/computing device. Network 150 may be a local area network, a wide area network (e.g., the Internet), or a combination of the two.

In some embodiments, authentication system 102 may use a database to store trust events for a particular user (e.g., an unknown user) in order to establish a trust score for that user without having to have the user provide identifying information. In some embodiments, the operations performed by authentication system 102 may be used in a computing environment that may enable a user to perform more and more privileged operations based on user activities in relation to those privileges that the user has. In yet some embodiments, the operations performed by authentication system 102 may be used in a financial context. For example, a user may desire to cash a check at an institution where the user has no account. Accordingly, the trust is very low initially when a user comes in for the first time. Thus, the user may have to pay a large amount to cash a check. However, as the user comes in more and more, the trust in the user may be elevated based on the number of checks and the amounts the user has cashed. However, when a user comes into another institution, that trust may be very low as well. With the operations described within this disclosure, the user may be given elevated privileges based on activities performed in different financial institutions even if the user has not provided identification.

In some embodiments, authentication system 102 may receive a first request for a first database operation. The first database operation may include first trust event data for a first trust event associated with a user to be written to a database. For example, a user may come into a financial office and ask for a check to be cashed. The person at the counter may take the check and give the user cash. The user may provide some type of a user identifier (e.g., electronically) so that the transaction can be associated with the user. When the financial office submits the check to the banking institution responsible for the check and receives funds for the amount of the check, the transaction may be labeled as successful. Thus, authentication system 102 may receive, from the financial office, the request for the database operation to record the successful operation. The request may include a user identifier and other parameters. For example, in the financial embodiments, the parameters may include the amount associated with the transaction, the amount the user paid for cashing the check, and/or other suitable parameters.

In some embodiments, this process may be performed in relation to a blockchain, which may be considered a special database. That is, the database may be a blockchain. Furthermore, the first trust event data may include a first plurality of parameters associated with the first trust event. Blockchain technology will be described further in this disclosure. Accordingly, authentication system 102 may receive, from a first device, a first request for a first blockchain operation. The first blockchain operation may instruct a blockchain node to write, to a blockchain, first trust event data for a first trust event associated with a user. The first trust event data may include a first validated activity associated with the user. As described above, the request may be received from a computing device (e.g., one of computing devices 108a-108n) associated with the financial office where the check was cashed. Furthermore, the first trust event data may include parameters such as a total value of the transaction, a user identifier (e.g., an identifier of the user's cryptographic wallet, sometimes referred to as a cryptography-based storage application), a financial office identifier, and/or a cryptographic signature of the financial office (e.g., based on an associated cryptography-based storage application).

Authentication system 102 may receive the first request via communication subsystem 112, which may include software components, hardware components, or a combination of both. For example, communication subsystem 112 may include a network card (e.g., a wireless network card and/or a wired network card) that is associated with software to drive the card. Communication subsystem 112 may pass the first request to database operation subsystem 114 for further processing (e.g., for database submission, such as blockchain operators).

Authentication system 102 may also receive, subsequent to the first request, a second request for a second database operation. The second database operation may include second trust event data for a second trust event associated with the user to be written into the database. The second request may be another request associated with the user. For example, a user may come back to the financial office or a different financial office to perform another transaction (e.g., cash another check) or perform another operation. In some embodiments, authentication system 102 may receive second trust event data, which may include a second plurality of parameters associated with the second trust event. For example, as for the first trust event data, the second trust event data may include parameters such as a user identifier an/or other parameters.

In one example, the user (e.g., the same user as discussed above) may come into a financial office and ask for a check to be cashed. The person at the counter may take the check and give the user cash. The user may provide some type of a user identifier (e.g., electronically) so that the transaction can be associated with the user. When the financial office submits the check to the banking institution responsible for the check and receives funds for the amount of the check, the transaction may be labeled as successful. Thus, authentication system 102 may receive, from the financial office, the request for the database operation to record the successful operation. The request may include a user identifier and other parameters. For example, in the financial embodiments, the parameters may include the amount associated with the transaction, the amount the user paid for cashing the check, and/or other suitable parameters. In some embodiments, the parameters may include computing operation parameters associated with a successful operation.

As discussed above in relation to the first request, the second request may also be a request for a blockchain operation. In particular, authentication system 102 may receive, from a second device subsequent to the first request, a second request for a second blockchain operation. The second blockchain operation may instruct the blockchain node to write, to the blockchain, second trust event data for a second trust event associated with the user. Furthermore, the second trust event data may include a second validated activity associated with the user. For example, authentication system 102 may receive another transaction associated with the user and write that transaction to the blockchain. In some embodiments, authentication system 102 may receive the second request from the same device as the first request.

When database operation subsystem 114 receives each request, database operation subsystem 114 may write the requests to the database. Database operation subsystem 114 may include software components, hardware components, or a combination of both. For example, database operation subsystem 114 may include software components that access blockchain data. In some embodiments, database operation subsystem 114 may perform the following operations for committing the trust event data to the database. Database operation subsystem 114 may retrieve a plurality of parameters from a data structure representing the trust event data (e.g., first trust event data or second trust event data). Database operation subsystem 114 may then write the parameters to the database such that the parameters are associated with the particular user. In some embodiments, if database operation subsystem 114 is seeing the user identifier for the first time, database operation subsystem 114 may generate a new user data structure within the database.

In some embodiments, database operation subsystem 114 may commit the parameters to a blockchain using a blockchain operation. For example, database operation subsystem 114 may manage a cryptography-based storage application, sometimes referred to as a cryptographic wallet. Using the cryptography-based storage application, database operation subsystem 114 may generate a blockchain operation to write the parameters to the blockchain. In some embodiments, database operation subsystem 114 may send the blockchain operation to a blockchain node. However, database operation subsystem 114 may be hosted on a device that is also able to act as a blockchain node. Accordingly, database operation subsystem 114 may just pass the data to the blockchain node operating system.

In some embodiments, authentication system 102 may receive the trust event data (e.g., the first trust event data or the second trust event data) as validated. For example, an operator at a financial office may only submit trust event data when a check has cleared. However, in certain instances, the trust event data may be received prior to validation (e.g., prior to the check clearing). Accordingly, database operation subsystem 114 may perform different operations based on whether the data being received is validated or not. In particular, database operation subsystem 114 may determine that the second request includes a second validated activity indicator related to the user. For example, database operation subsystem 114 may receive the second request and identify, within the second request, a data structure that represents the trust event data. Database operation subsystem 114 may then retrieve the parameters of the trust event data from the data structure and identify a field that indicates whether the trust event data is validated or not validated (e.g., whether the check has cleared or has not cleared). Based on determining that the second request includes the second validated activity indicator, database operation subsystem 114 may write the second trust event data into the database. That is, if the trust event data is validated, database operation subsystem 114 may commit the trust event data to the database.

If database operation subsystem 114 determines that the trust event data is not validated, database operation subsystem 114 may perform different operations. In particular, database operation subsystem 114 may determine that the first request does not include a first validated activity indicator related to the user. For example, database operation subsystem 114 may determine that the validated activity indicator is not present with the trust event data or that a validity indicator indicates that the data has not been validated. Based on determining that the first request does not include the first validated activity indicator, database operation subsystem 114 may write the first trust event data into temporary storage. For example, temporary storage may be a database table where the data may reside until validated. In some embodiments, the data may reside as an unexecuted blockchain transaction, which may be placed in a transaction table to be executed.

In some embodiments, where database operation subsystem 114 receives the validated activity indicator, database operation subsystem 114 may pass that indicator to validation subsystem 116. Validation subsystem 116 may include software components, hardware components, or a combination of both. When validation subsystem 116 receives that validated activity indicator, it may perform the following operations. In particular, validation subsystem 116 may receive the first validated activity indicator subsequent to the first request. For example, when a check clears, an operator at the financial institution or an automated system may determine that the check has cleared for a particular user and transmit the indicator to validation subsystem 116.

Validation subsystem 116 may receive the indicator and determine that the first validated activity indicator indicates that the first trust event data has been validated. For example, the indicator may be received with a transaction identifier or another suitable identifier that identifies the associated trust event data. Based on the identifier, validation subsystem 116 may locate the associated trust event data (e.g., with the corresponding database table or within a set of unexecuted blockchain operations). When validation subsystem 116 locates the associated trust event data, validation subsystem 116 may write the first trust event data into the database. For example, validation subsystem 116 may commit the trust event data to a database table or execute the blockchain operation.

FIG. 2 illustrates a portion of a request 200 to write trust event data to a database. Field 203 may store a user identifier. In some embodiments, the user identifier may be a string, a decimal, or a hexadecimal number. In yet some embodiments, the user identifier may be a blockchain address corresponding to a cryptography-based storage application associated with the user. Field 206 may store a first parameter of the trust event data. For example, the first parameter may be a total transaction amount. Field 209 and field 212 may be other parameters such as dates, times, permissions, and/or other values.

Figure 3:
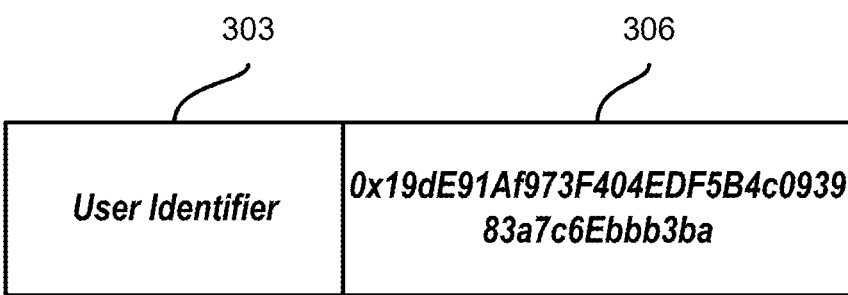
FIG. 3 illustrates multiple metric requests, in accordance with one or more embodiments of this disclosure.
Figure 3:
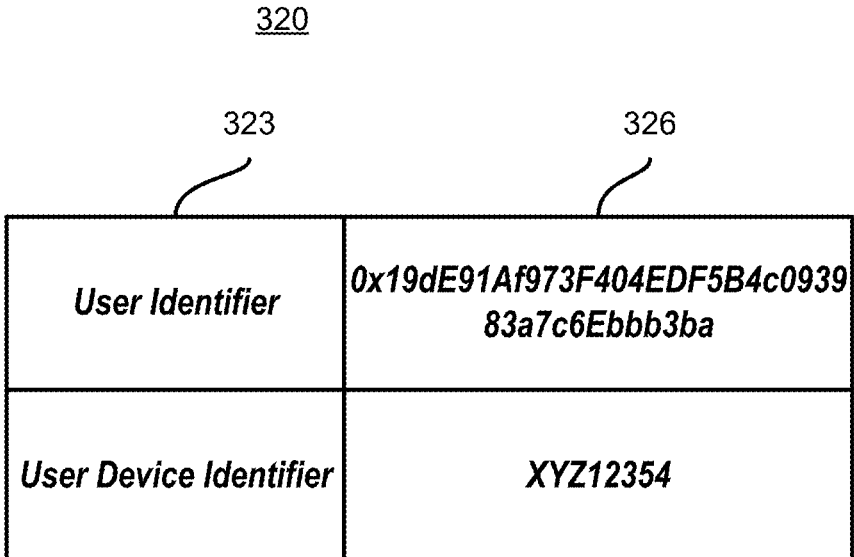

Authentication system 102 may also receive requests for authentication metrics associated with different users. For example, when a user walks into a financial office, he or she may be able to present an electronic device or a code (e.g., having a user identifier) to an operator, and the operator may be able to determine how risky the user is (e.g., how risky it would be to cash a user's check) based on the data associated with the user's identifier. Thus, authentication system 102 may receive, from a requesting device, a metric request for an authentication metric. For example, the metric request may include an identifier associated with the user so that trust event data for that particular user may be retrieved from the database. FIG. 3 illustrates an excerpt of a metric request 300. Metric request 300 may include field 303 for storing field names and field 306 for storing associated values. Other information may be included in the metric request (e.g., authentication data for the user, date/time information, and/or other information).

In some embodiments, as discussed above, the trust event data may be stored on a blockchain. In those instances, authentication system 102 may receive, from a requesting device, a metric request for an authentication metric. The metric request may include a cryptographic signature generated by a cryptography-based storage application storing a private key associated with the user. For example, an operator or a computer system at a financial office may generate a blockchain operation to be executed by a blockchain node. The blockchain operation may be signed by a cryptographic signature associated with the user. That is, a user device may generate a cryptographic signature using a private key on the user device and transmit the signature to an operator device. An operator device may generate the blockchain operation and include the cryptographic signature of the user from the user device in the blockchain operation.

In some embodiments, authentication system 102 may, instead of or in addition to including the signature within the blockchain operation, authenticate the metric request using the cryptographic signature. For example, validation subsystem 116 may retrieve a public key associated with the user (e.g., from the blockchain) and use the public key to authenticate the cryptographic signature associated with the user that was received as part of the metric request. In particular, validation subsystem 116 may receive, from the requesting device, within the metric request, a cryptographic signature generated by a cryptography-based storage application associated with the user. The cryptographic signature may be based on a private key associated with the user. For example, the cryptographic signature may be generated on a user device using the private key. Validation subsystem 116 may then authenticate the metric request using the cryptographic signature.

Based on the request, authentication system 102 may generate an authentication metric. In particular, authentication system 102 may receive the trust event data from the database using communication subsystem 112 and pass the trust event data to metric generation subsystem 118. Metric generation subsystem 118 may include software components, hardware components, or a combination of both. In some embodiments, metric generation subsystem 118 may generate, based on the first trust event data and the second trust event data that has been written to the database, the authentication metric for the user. The authentication metric may indicate a trust level associated with the user. Furthermore, the authentication metric may be increasing as more trust event data is recorded in association with the user. Thus, the second database operation, in combination with the first database operation, may cause the authentication metric to be higher than before the first database operation. For example, a user may cash a first check and when the check clears, the validated data may be transmitted to the database or written to the blockchain. Parameters such as the amount of the check, time to clear, etc., may be written to the database and may be used to determine an authentication metric for the user. When the user cashes a second check, the trust event data for the check may be written to the database or the blockchain. That data may also be used to increase the authentication metric.

In some embodiments, an authentication metric for each event trust data may be generated and combined into an overall authentication metric. Metric generation subsystem 118 may retrieve, from the first trust event data, a first plurality of parameters associated with the first trust event and, from the second trust event data, a second plurality of parameters associated with the second trust event. For example, authentication system 102 may receive the trust event data via communication subsystem 112 and pass the trust event data to metric generation subsystem 118. The trust event data may include data for a multitude of trust events. Metric generation subsystem 118 may extract the parameters from the trust event data.

Metric generation subsystem 118 may determine, based on the first plurality of parameters, a first trust metric and, based on the second plurality of parameters, a second trust metric. For example, the trust metric may be higher if the transaction account is higher. In another example, the faster a check clears, the higher the metric may be. Other parameters within the trust event data may influence each trust metric. Metric generation subsystem 118 may then combine the first trust metric and the second trust metric to generate the authentication metric. For example, metric generation subsystem 118 may multiply the trust metrics, add the trust metrics, or perform another operation on the trust metrics to generate the authentication metric.

As discussed above, the trust event data may be stored on a blockchain and may need to be accessed using a cryptography-based storage application and/or other blockchain protocols. In particular, metric generation subsystem 118 may generate, based on the first trust event data and the second trust event data that has been written to the blockchain, the authentication metric for the user. The authentication metric may indicate a trust level associated with the user. Furthermore, the authentication metric may be increased based on each subsequent blockchain operation that includes validated activity. For example, the authentication metric may be higher after a second validated activity than after the first validated activity. Thus, when the user cashes the first check and the check clears, the user may have a first authentication metric. Subsequently, when the user cashes another check and that check clears, the user may have a higher authentication metric (e.g., based on a combination of trust metrics described above).

In some embodiments, the trust event data may be encrypted on the blockchain so that it may only be accessed with approval of the user. Thus, authentication system 102 may retrieve a public key associated with the user based on a user identifier within the first request. For example, the first request may include a user identifier that may be a blockchain address or another suitable identifier. Database operation subsystem 114 may retrieve the user identifier and determine/retrieve a public key associated with the user based on the identifier. In some embodiments, the public key may be stored in a database (e.g., on data node 104). However, in some embodiments, database operation subsystem 114 may construct the public key based on the user identifier using a predetermined algorithm. It should be noted that the corresponding private key may be stored on a device associated with the user and may be used to decrypt the trust event data when a retrieval operation is being performed.

Database operation subsystem 114 may encrypt a first plurality of parameters within the first trust event data and a second plurality of parameters within the second trust event data using the public key associated with the user to generate encrypted first trust event data and encrypted second trust event data. The encrypted trust event data may be decrypted using a private key associated with the user (e.g., a private key stored within a cryptography-based storage application). Database operation subsystem 114 may then write the encrypted first trust event data and the encrypted second trust event data to the database.

When the trust event data is encrypted, metric generation subsystem 118 may use a particular mechanism to generate an authentication metric. In particular, metric generation subsystem 118 may transmit, to a user device, a first identifier of the encrypted first trust event data and a second identifier of the second trust event data. The user device may decrypt the encrypted first trust event data and the second trust event data using a private key associated with the user. For example, the user device may use the first and second identifiers to retrieve the encrypted data (e.g., from a database or the blockchain) and decrypt that data using the private key stored on the user's device. Metric generation subsystem 118 may then receive the first trust event data and the second trust event data from the user device to generate the authentication metric. That is, the client device may transmit the first trust event data and the second trust event data to metric generation subsystem 118.

It should be noted that in these embodiments, authentication system 102 may use a special request, as shown in FIG. 3. Request 320 of FIG. 3 may include field names 323 (e.g., including a user identifier and a device identifier) and field 326, which stores the values for those field names. Thus, metric generation subsystem 118 may receive a user device identifier as part of the request so that the user device is able to decrypt the data.

As discussed above, in some embodiments, authentication system 102 may encrypt the first plurality of parameters and the second plurality of parameters using the public key associated with the user and an encryption mechanism that enables a private key corresponding to the public key to decrypt the first plurality of parameters and the second plurality of parameters. This may be used in blockchain embodiments, where the public key may be used to encrypt data with a private key used to decrypt data. Accordingly, database operation subsystem 114 may use the following operations to write the encrypted first trust event data and the encrypted second trust event data to the database. Database operation subsystem 114 may generate a blockchain operation using the public key associated with the user such that a corresponding private key may be stored within a cryptography-based storage application associated with the user. The blockchain operation may instruct the blockchain node to write the data to the blockchain in association with the user's identifier. Database operation subsystem 114 may then transmit a command to a blockchain node to write the encrypted first trust event data and the encrypted second trust event data to a block of a blockchain to be controlled by the cryptography-based storage application of the user. That is, only the cryptography-based storage application associated with the user is able to decrypt the data using an associated private key.

As discussed above, the authentication metric may be generated on the fly based on the trust event data within the database or on the blockchain. However, in some embodiments, the authentication metric may be partly pre-generated. FIG. 4 illustrates a portion of a data structure 400 for generating trust metrics for an authentication metric. Row 403 illustrates how trust data may be stored in association with the trust parameters for a first event. In addition, row 403 illustrates that a trust metric may be generated based on the parameters in row 403 and may be stored with that row. Row 406, row 409, and row 412 may have their own parameters and their own trust metrics. Thus, metric generation subsystem 118 may use the trust metrics within the rows to generate an authentication metric.

When the authentication metric is generated, metric generation subsystem 118 may use communication subsystem 112 to transmit the authentication metric to the requesting device. The requesting device may then use the authentication metric to assign a level of trust to a user. For example, if a user keeps cashing checks that keep clearing, a financial office may charge the user less for the service because as the user performs more activities, there is less risk to the financial office. In another embodiment, the disclosed embodiments may be used for cashing travel checks (e.g., in foreign countries) where there is little or no trust for a user. However, if the financial office in a foreign country has access to the trust event data, the user may be assigned a trust level based on the authentication metric. A trust level may be a number, a letter, or a category (e.g., low, medium, high).

FIG. 5 illustrates a portion of an alternative data structure 500 for storing trust metrics for an authentication metric. For example, it may be desirable for a requester not to have access to the parameters of the trust event data. Accordingly, metric generation subsystem 118 may access different trust data associated with the user and will be enabled to retrieve a corresponding trust metric, but not the underlying parameters (e.g., because those parameters are encrypted or inaccessible for the requester). Accordingly, field 503 stores the trust data identifiers and field 506 stores the corresponding trust metrics for generating an authentication metric.

Computing Environment

Figure 6:
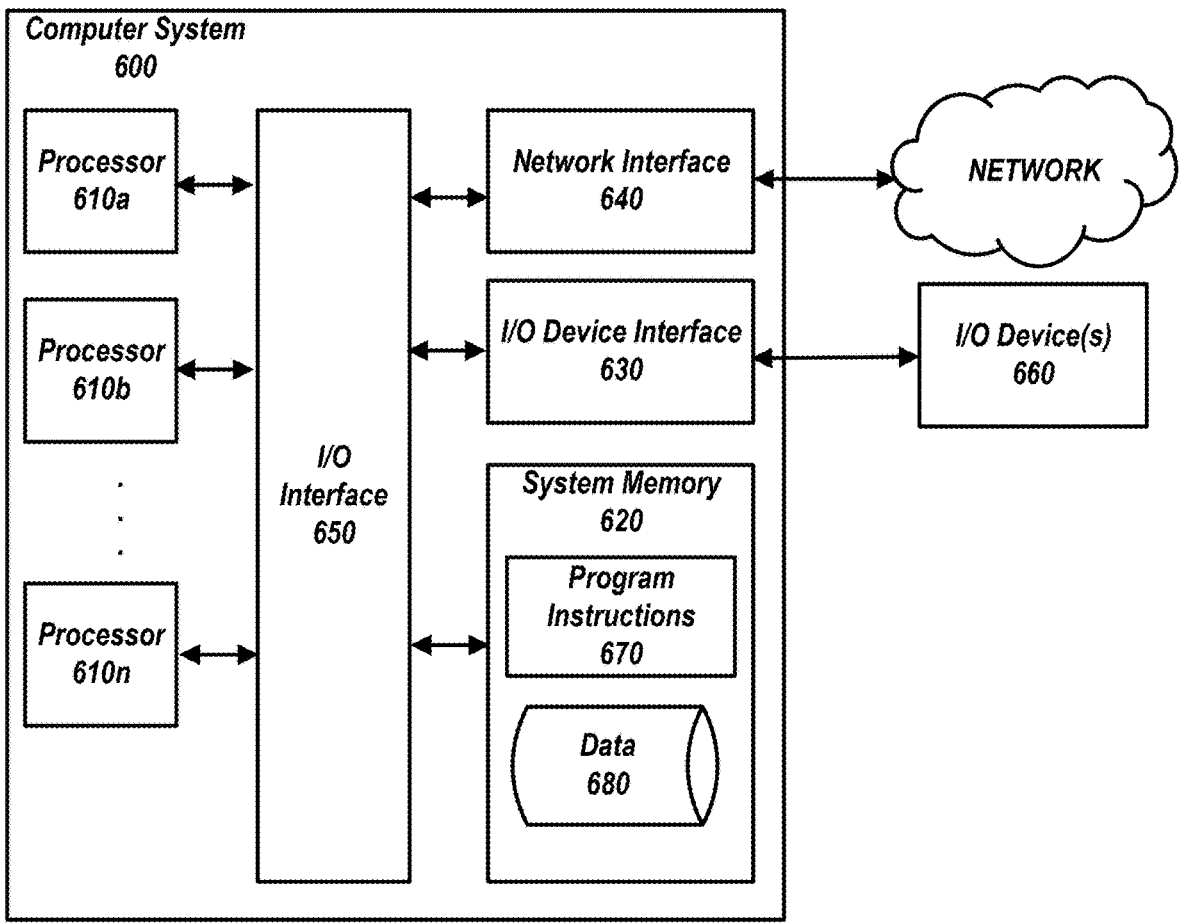
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*) or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random-access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Blockchain Environment

Figure 7:
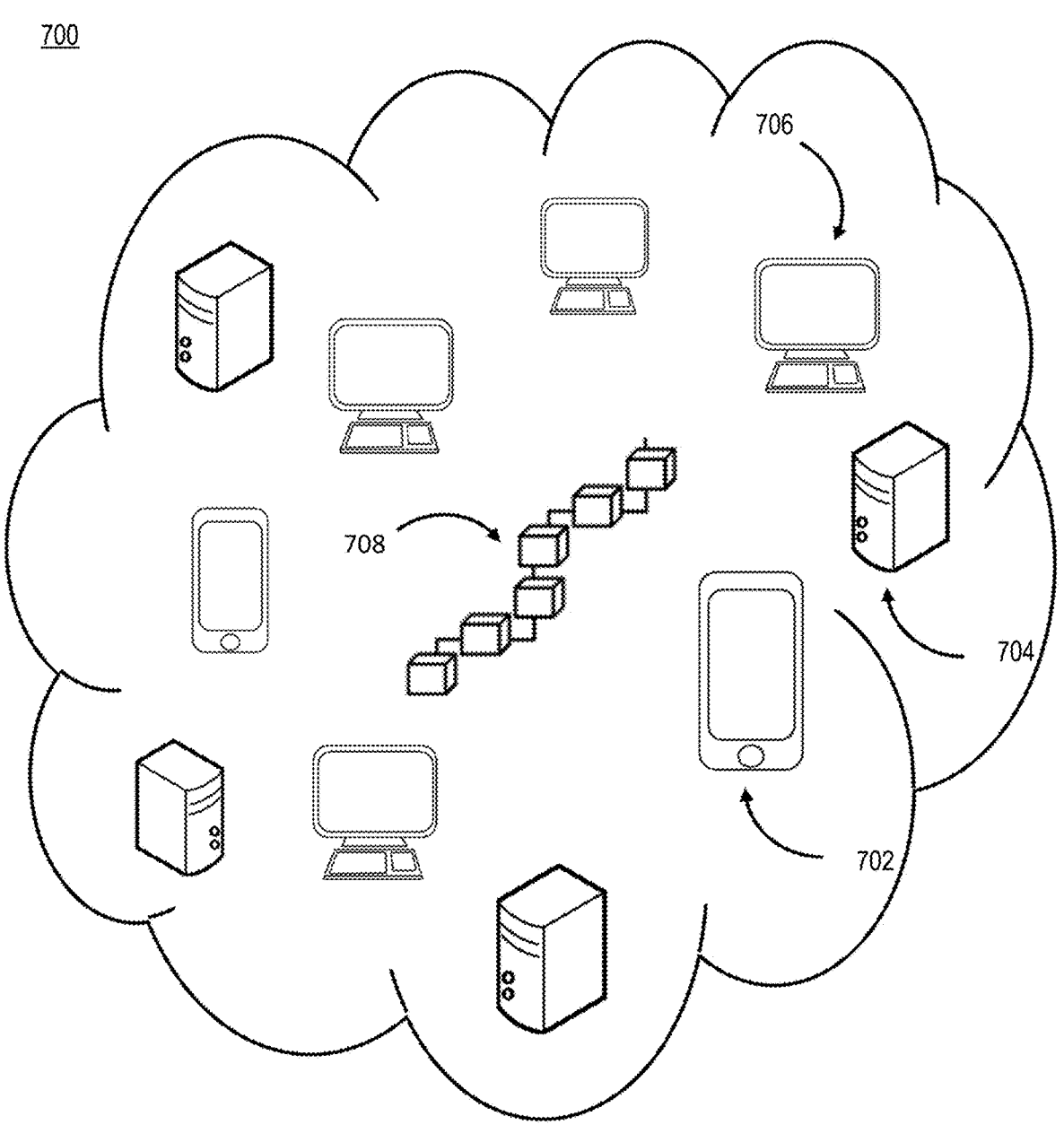
FIG. 7 shows an illustrative diagram for a decentralized environment for performing blockchain functions or operations, in accordance with one or more embodiments.

FIG. 7 shows an illustrative diagram for a decentralized environment for performing blockchain functions or operations, in accordance with one or more embodiments. For example, the diagram presents various components that may be used to allocate and distribute cryptographic resources in response to an off-chain trigger or event upon request, in some embodiments.

As shown in FIG. 7, system 700 may include multiple user devices (e.g., user device 702, user device 704, and/or user device 706). For example, system 700 may comprise a distributed state machine in which each of the components in FIG. 7 acts as a client of system 700. For example, system 700 (as well as other systems described herein) may comprise a large data structure that holds not only all accounts and balances but also a state machine that can change from block to block according to a predefined set of rules and that can execute arbitrary machine code. The specific rules of changing state from block to block may be maintained by a virtual machine (e.g., a computer file implemented on and/or accessible by a user device, which behaves like an actual computer) for the system. For example, system 700 may interact with, and facilitate the function of, blockchain 708.

It should be noted that, while shown as a smartphone, a personal computer, and a server in FIG. 7, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 700 performing a blockchain function may equally be applied to, and correspond to, an individual user device (e.g., user device 702, user device 704, and/or user device 706) performing the blockchain function. That is, system 700 may correspond to the user devices (e.g., user device 702, user device 704, and/or user device 706) collectively or individually.

Each of the user devices may be used by the system to conduct blockchain functions or operations and/or contribute to allocating and distributing cryptographic resources in response to an off-chain trigger or event upon request. As referred to herein, "blockchain functions" or "blockchain operations" may comprise any operations including and/or related to blockchains and blockchain technology. For example, blockchain functions or operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function or operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions or operations may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for enabling Turing-complete computation while limiting the resources that any smart contract and/or blockchain function may consume.

In some embodiments, gas may be obtained as part of a blockchain function or operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 7, one or more user devices may include a digital wallet (e.g., cryptography-based storage application described above) used to perform blockchain functions or operations. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet, while cold wallets are not. Most digital wallet holders hold both a hot wallet (e.g., residing on a computing device) and a cold wallet (residing on a device that is generally disconnected from a computing device and is not accessible until connected). Hot wallets are most often used to perform blockchain functions, while a cold wallet is generally used for managing a user account and may have no connection to the Internet.

One or more user devices may include a private key and a public key. In such cases, each pair comprises a public key (e.g., which may be public) and a private key (e.g., which may be kept private). Key pairs may be generated using cryptographic algorithms (e.g., featuring one-way functions). Computing devices may then encrypt a message using an intended receiver's public key such that the encrypted message may be decrypted only with the receiver's corresponding private key. In some embodiments, a message may be used in combination with a private key to create a digital signature on the message. For example, the digital signature may be used to verify the authenticity of blockchain functions or operations. As an illustration, when conducting blockchain functions, the digital signature may be used to prove to every node in the system that it is authorized to conduct the blockchain functions.

For example, system 700 may comprise a plurality of nodes for the blockchain network. A node for a blockchain network may comprise an application or other software that records and/or monitors peer connections to other nodes and/or miners for the blockchain network. For example, a miner comprises a node in a blockchain network that facilitates blockchain functions by verifying blockchain functions or operations on the blockchain, adding new blocks to the existing chain, and/or ensuring that these additions are accurate. The nodes may continually record the state of the blockchain and respond to remote procedure requests for information about the blockchain.

Following an authentication of the blockchain function, the blockchain function may be authorized. For example, after the blockchain function is authenticated between the users, system 700 may authorize the blockchain function prior to adding it to the blockchain. Blockchain functions or operations may be added to blockchain 708 via blockchain nodes. The blockchain may perform this (via blockchain nodes) based on a consensus within the blockchain network. For example, system 700 may rely on a majority (or other metric) of the nodes in the community network to determine that the blockchain function or operation is valid. In response to validation of the block, a blockchain node in the community network (e.g., a miner) may receive a reward (e.g., in a given cryptocurrency) as an incentive for validating the block.

To validate the blockchain function, a blockchain node may use one or more validation protocols and/or validation (or consensus) mechanisms. For example, a blockchain node may use a Proof of Work (POW) mechanism in which a user device must provide evidence that it performed computational work to validate a blockchain function, and thus, this mechanism provides for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, a blockchain node may use a Proof of Stake (POS) mechanism in which a user account (e.g., corresponding to a node on the blockchain network) is required to have, or "stake," a predetermined amount of tokens in order to be recognized as a validator in the blockchain network. In response to validation of the block, the block is added to blockchain 708, and the blockchain function is completed. For example, to add the blockchain function to blockchain 708, the successful node (e.g., the successful miner) encapsulates the blockchain function in a new block before committing it to the blockchain.

Operation Flow

Figure 8:
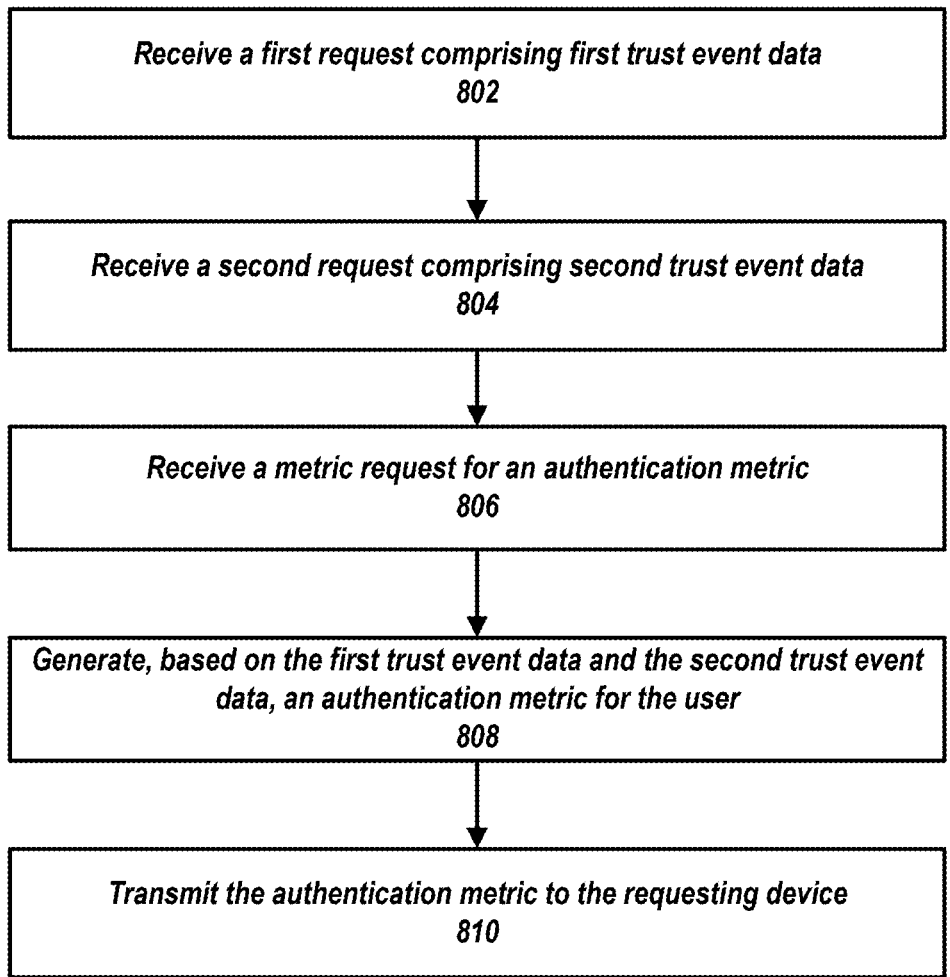
FIG. 8 is a flowchart of operations for elevating a user's authentication level as the user performs more operations, in accordance with one or more embodiments of this disclosure.

FIG. 8 is a flowchart of operations 800 for elevating a user's authentication level as the user performs more operations. The operations of FIG. 8 may use components described in relation to FIG. 6 and/or FIG. 7. In some embodiments, authentication system 102 may include one or more components of computer system 600 and may use blockchain components of FIG. 7, in blockchain embodiments. At 802, authentication system 102 receives a first request that includes first trust event data. For example, authentication system 102 may receive the first request using network interface 640 over network 150. At 804, authentication system 102 receives a second request comprising second trust event data. For example, authentication system 102 may receive the second request using network interface 640 over network 150. Authentication system 102 may store the received requests in system memory 620.

At 806, authentication system 102 receives a metric request for an authentication metric. For example, authentication system 102 may use one or more processors 610*a*, 610*b*, and/or 610*n* to retrieve the data from system memory 620. For example, authentication system 102 may receive the metric request using network interface 640 over network 150. Authentication system 102 may store the received metric request in system memory 620.

At 808, authentication system 102 generates, based on the first trust event data and the second trust event data, an authentication metric for the user. For example, authentication system 102 may use one or more processors 610*a*, 610*b*, and/or 610*n* to generate the authentication metric and store the authentication metric in system memory 620. At 810, authentication system 102 transmits the authentication metric to the requesting device. For example, authentication system 102 may transmit the authentication metric using network interface 640 over network 150.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flow-charts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a first request for a first database operation, wherein the first database operation comprises first trust event data for a first trust event associated with a user to be written to a database; receiving, subsequent to the first request, a second request for a second database operation, wherein the second database operation comprises second trust event data for a second trust event associated with the user to be written into the database; receiving, from a requesting device, a metric request for an authentication metric; generating, based on the first trust event data and the second trust event data that has been written to the database, the authentication metric for the user, wherein the authentication metric indicates a trust level associated with the user, and wherein the authentication metric has increased based on the second database operation; and transmitting the authentication metric to the requesting device.

2. Any of the preceding embodiments, wherein the database is a blockchain, and wherein the first trust event data comprises a first plurality of parameters associated with the first trust event and the second trust event data comprises a second plurality of parameters associated with the second trust event.

3. Any of the preceding embodiments, further comprising: receiving, from the requesting device, within the metric request, a cryptographic signature generated by a cryptography-based storage application associated with the user, wherein the cryptographic signature is based on a private key associated with the user; and authenticating the metric request using the cryptographic signature.

4. Any of the preceding embodiments, further comprising: retrieving, from the first trust event data, a first plurality of parameters associated with the first trust event, and, from the second trust event data, a second plurality of parameters associated with the second trust event; determining, based on the first plurality of parameters, a first trust metric, and, based on the second plurality of parameters, a second trust metric; and combining the first trust metric and the second trust metric to generate the authentication metric.

5. Any of the preceding embodiments, further comprising: retrieving a public key associated with the user, based on a user identifier within the first request; encrypting a first plurality of parameters within the first trust event data and a second plurality of parameters within the second trust event data using the public key associated with the user to generate encrypted first trust event data and encrypted second trust event data; and writing the encrypted first trust event data and the encrypted second trust event data to the database.

6. Any of the preceding embodiments, wherein generating the authentication metric for the user comprises: transmitting, to a user device, a first identifier of the encrypted first trust event data and a second identifier of the second trust event data, wherein the user device decrypts the encrypted first trust event data and the second trust event data using a private key associated with the user; and receiving the first trust event data and the second trust event data from the user device to generate the authentication metric.

7. Any of the preceding embodiments, wherein encrypting the first plurality of parameters and the second plurality of parameters comprises using the public key associated with the user and an encryption mechanism that enables a private key corresponding to the public key to decrypt the first plurality of parameters and the second plurality of parameters.

8. Any of the preceding embodiments, wherein writing the encrypted first trust event data and the encrypted second trust event data to the database comprises: generating a blockchain operation using the public key associated with the user, wherein a corresponding private key is stored within a cryptography-based storage application associated with the user; and transmitting a command to a blockchain node to write the encrypted first trust event data and the encrypted second trust event data to a block of a blockchain to be controlled by the cryptography-based storage application.

9. Any of the preceding embodiments, further comprising: determining that the second request comprises a second validated activity indicator related to the user; and based on determining that the second request comprises the second validated activity indicator, writing the second trust event data into the database.

10. Any of the preceding embodiments, further comprising: determining that the first request does not include a first validated activity indicator related to the user; and based on determining that the first request does not include the first validated activity indicator, writing the first trust event data into temporary storage.

11. Any of the preceding embodiments, further comprising: receiving the first validated activity indicator subsequent to the first request; determining that the first validated activity indicator indicates that the first trust event data has been validated; and writing the first trust event data into the database.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

What is claimed is:

1. A system for elevating user trust based on blockchain operations, the system comprising:

one or more processors; and one or more non-transitory, computer-readable storage media storing instructions, which, when executed by the one or more processors, cause the one or more processors to perform operations comprising:

receiving, from a first device, a first request for a first blockchain operation, wherein the first blockchain operation instructs a blockchain node to write, to a blockchain, first trust event data for a first trust event associated with a user, and wherein the first trust event data comprises a first validated activity associated with the user;

receiving, from a second device subsequent to the first request, a second request for a second blockchain operation, wherein the second blockchain operation instructs the blockchain node to write, to the blockchain, second trust event data for a second trust event associated with the user, and wherein the second trust event data comprises a second validated activity associated with the user;

receiving, from a requesting device, a metric request for an authentication metric, wherein the metric request comprises a cryptographic signature generated by a cryptography-based storage application storing a private key associated with the user;

authenticating the metric request using the cryptographic signature;

generating, based on the first trust event data and the second trust event data that has been written to the blockchain, the authentication metric, wherein the authentication metric indicates a trust level associated with the user, and wherein the authentication metric has increased based on each blockchain operation that comprises validated activity; and transmitting the authentication metric to the requesting device.

2. A method for elevating user trust, the method comprising:

receiving a first request for a first database operation, wherein the first database operation comprises first trust event data for a first trust event associated with a user to be written to a database;

receiving, subsequent to the first request, a second request for a second database operation, wherein the second database operation comprises second trust event data for a second trust event associated with the user to be written into the database;

receiving, from a requesting device, a metric request for an authentication metric;

generating, based on the first trust event data and the second trust event data that has been written to the database, the authentication metric, wherein the authentication metric indicates a trust level associated with the user, and wherein the authentication metric has increased based on the second database operation; and transmitting the authentication metric to the requesting device.

3. The method of claim 2, wherein the database is a blockchain, and wherein the first trust event data comprises a first plurality of parameters associated with the first trust event and the second trust event data comprises a second plurality of parameters associated with the second trust event.

4. The method of claim 3, further comprising:

receiving, from the requesting device, within the metric request, a cryptographic signature generated by a cryptography-based storage application associated with the user, wherein the cryptographic signature is based on a private key associated with the user; and authenticating the metric request using the cryptographic signature.

5. The method of claim 2, further comprising:

retrieving, from the first trust event data, a first plurality of parameters associated with the first trust event, and, from the second trust event data, a second plurality of parameters associated with the second trust event;

determining, based on the first plurality of parameters, a first trust metric, and, based on the second plurality of parameters, a second trust metric; and combining the first trust metric and the second trust metric to generate the authentication metric.

6. The method of claim 2, further comprising:

retrieving a public key associated with the user, based on a user identifier within the first request;

encrypting a first plurality of parameters within the first trust event data and a second plurality of parameters within the second trust event data using the public key associated with the user to generate encrypted first trust event data and encrypted second trust event data; and writing the encrypted first trust event data and the encrypted second trust event data to the database.

7. The method of claim 6, wherein generating the authentication metric comprises:

transmitting, to a user device, a first identifier of the encrypted first trust event data and a second identifier of the second trust event data, wherein the user device decrypts the encrypted first trust event data and the second trust event data using a private key associated with the user; and receiving the first trust event data and the second trust event data from the user device to generate the authentication metric.

8. The method of claim 6, wherein encrypting the first plurality of parameters and the second plurality of parameters comprises using the public key associated with the user and an encryption mechanism that enables a private key corresponding to the public key to decrypt the first plurality of parameters and the second plurality of parameters.

9. The method of claim 6, wherein writing the encrypted first trust event data and the encrypted second trust event data to the database comprises:

generating a blockchain operation using the public key associated with the user, wherein a corresponding private key is stored within a cryptography-based storage application associated with the user; and transmitting a command to a blockchain node to write the encrypted first trust event data and the encrypted second trust event data to a block of a blockchain to be controlled by the cryptography-based storage application.

10. The method of claim 2, further comprising:

determining that the second request comprises a second validated activity indicator related to the user; and based on determining that the second request comprises the second validated activity indicator, writing the second trust event data into the database.

11. The method of claim 2, further comprising:

determining that the first request does not include a first validated activity indicator related to the user; and based on determining that the first request does not include the first validated activity indicator, writing the first trust event data into temporary storage.

12. The method of claim 11, further comprising:

receiving the first validated activity indicator subsequent to the first request;

determining that the first validated activity indicator indicates that the first trust event data has been validated; and writing the first trust event data into the database.

13. One or more non-transitory, computer-readable storage media storing instructions that, when executed by one or more processors, cause the one or more processors to perform operations comprising:

receiving a first request for a first database operation, wherein the first database operation comprises first trust event data for a first trust event associated with a user to be written to a database;

receiving a second request for a second database operation, wherein the second database operation comprises second trust event data for a second trust event associated with the user to be written into the database;

receiving, from a requesting device, a metric request for an authentication metric;

generating, based on the first trust event data and the second trust event data that has been written to the database, the authentication metric, wherein the authentication metric indicates a trust level associated with the user, and wherein the authentication metric has increased based on the second database operation; and transmitting the authentication metric to the requesting device.

14. The one or more non-transitory, computer-readable storage media of claim 13, wherein the database is a blockchain, and wherein the first trust event data comprises a first plurality of parameters associated with the first trust event and the second trust event data comprises a second plurality of parameters associated with the second trust event.

15. The one or more non-transitory, computer-readable storage media of claim 14, wherein the instructions further cause the one or more processors to perform operations comprising:

receiving, from the requesting device, within the metric request, a cryptographic signature generated by a cryptography-based storage application associated with the user, wherein the cryptographic signature is based on a private key associated with the user; and authenticating the metric request using the cryptographic signature.

16. The one or more non-transitory, computer-readable storage media of claim 13, wherein the instructions further cause the one or more processors to perform operations comprising:

retrieving, from the first trust event data, a first plurality of parameters associated with the first trust event and, from the second trust event data, a second plurality of parameters associated with the second trust event;

determining, based on the first plurality of parameters, a first trust metric, and, based on the second plurality of parameters, a second trust metric; and combining the first trust metric and the second trust metric to generate the authentication metric.

17. The one or more non-transitory, computer-readable storage media of claim 13, wherein the instructions further cause the one or more processors to perform operations comprising:

retrieving a public key associated with the user, based on a user identifier within the first request;

encrypting a first plurality of parameters within the first trust event data and a second plurality of parameters within the second trust event data using the public key associated with the user to generate encrypted first trust event data and encrypted second trust event data; and writing the encrypted first trust event data and the encrypted second trust event data to the database.

18. The one or more non-transitory, computer-readable storage media of claim 17, wherein the instructions for generating the authentication metric further cause the one or more processors to perform operations comprising:

transmitting, to a user device, a first identifier of the encrypted first trust event data and a second identifier of the second trust event data, wherein the user device decrypts the encrypted first trust event data and the second trust event data using a private key associated with the user; and receiving the first trust event data and the second trust event data from the user device to generate the authentication metric.

19. The one or more non-transitory, computer-readable storage media of claim 17, wherein the instructions for encrypting the first plurality of parameters and the second plurality of parameters further cause the one or more processors to use the public key associated with the user and an encryption mechanism that enables a private key corresponding to the public key to decrypt the first plurality of parameters and the second plurality of parameters.

20. The one or more non-transitory, computer-readable storage media of claim 17, wherein the instructions for writing the encrypted first trust event data and the encrypted second trust event data to the database further cause the one or more processors to perform operations comprising:

generating a blockchain operation using the public key associated with the user, wherein a corresponding private key is stored within a cryptography-based storage application associated with the user; and transmitting a command to a blockchain node to write the encrypted first trust event data and the encrypted second trust event data to a block of a blockchain to be controlled by the cryptography-based storage application.

* * * * *